United States Patent [19]
Nakako et al.

[11] Patent Number: 5,549,016
[45] Date of Patent: Aug. 27, 1996

[54] WRIST MECHANISM FOR AN INDUSTRIAL ROBOT

[75] Inventors: Toru Nakako; Hideki Tanimura; Kouji Tukuda, all of Fukuoda, Japan

[73] Assignee: Kabushiki Kaisha Yaskawa Denki, Fukuoka, Japan

[21] Appl. No.: 351,440
[22] PCT Filed: Apr. 27, 1994
[86] PCT No.: PCT/JP94/00709
   § 371 Date: Dec. 14, 1994
   § 102(e) Date: Dec. 14, 1994
[87] PCT Pub. No.: WO94/25227
   PCT Pub. Date: Nov. 10, 1994

[30] Foreign Application Priority Data

Apr. 28, 1993 [JP] Japan .................................. 5-125315

[51] Int. Cl.$^6$ .................................................... B25J 17/02
[52] U.S. Cl. .................... 74/490.02; 74/490.06; 901/26; 901/29
[58] Field of Search .............. 74/490.02, 490.06; 901/26, 29

[56] References Cited

U.S. PATENT DOCUMENTS 4,218,166  8/1980  Akeel et al. .................... 901/26 X
4,703,668  11/1987  Peter ............................. 74/490.06
5,279,177  1/1994  Inada ............................. 74/490.06

*Primary Examiner*—Allan D. Herrmann
*Attorney, Agent, or Firm*—Jordan and Hamburg

[57] ABSTRACT

A wrist mechanism for an industrial robot has a second axis perpendicular to a first axis extending in a length direction of an arm and a third axis perpendicular to the second axis, the wrist mechanism comprising:, first reduction mechanism and second reduction mechanism supported at both sides of the front end portion of an arm having a cut portion so that they can be rotated about the second axis; a wrist frame including a hollow portion fixed the output shaft of the first reduction mechanism; a first bevel gear including a hollow portion provided on the wrist frame and supported so that it can be rotated about the third axis which is perpendicular to the second axis; a second bevel hear rotating about an axis parallel to the second axis and meshing with the first bevel gear (5); toothed wheel (71) integral with the second bevel gear; a toothed wheel fixed at the output shaft of the second reduction mechanism and meshing with the toothed wheel; and a tool fixing portion including a hollow portion, fixed to the first bevel gear. With this arrangement, the connection of cables and hoses are facilitated.

10 Claims, 1 Drawing Sheet

WRIST MECHANISM FOR AN INDUSTRIAL ROBOT

TECHNICAL FIELD

This invention relates to a wrist mechanism provided at the front end portion of an arm of an industrial robot.

BACKGROUND OF THE INVENTION

Heretofore, there is disclosed a wrist mechanism which comprises, at the front end portion of the arm of an industrial robot, a rotary shaft rotating about a second axis perpendicular to a first axis extending in a length direction of the arm and a rotary shaft rotating about a third axis perpendicular to the second axis, wherein two drive mechanisms for independently driving the second and third axes are provided, thus to thus rotate a tool fixing portion through a bevel gear about the second and third axes (e.g., Japanese Utility Model Application Laid Open No. 70896/1988).

Moreover, there is disclosed a wrist mechanism in which an arm is formed by three shafts of a the hollow structure in a concentric form. An inclined rotary portion in a hollow form rotating through a hollow bevel gear about a second axis inclined relative to a first axis extending in a length direction of the arm is provided at the front end portion thereof, and a hollow tool fixing portion rotating through a bevel gear about a third axis inclined relative to the second axis is provided (e.g., (Japanese Patent Application Laid Open However, in the prior art of the aforesaid Japanese U.M. application Laid Open No. 63-70896, since the front end portion of the arm is occupied by two drive mechanisms for independently driving the second and third axes, cable and hose for supplying electricity and fluid such as pressurized oil or pressurized air, etc. cannot be passed through the tool fixed at tool fixing portion, and such cable and hose are therefore disposed outside the wrist portion. For this reason, there was the problem that in the case where the wrist portion is rotated many number of times, cable or hose is wound around the wrist portion, so the rotational operation range of the wrist portion is limited.

Moreover, in the prior art of the aforesaid Japanese Patent Application Laid Open No. 61-168487, while cable or hose can be passed through the hollow arm, it is necessary to pass such cable or hose inside three hollow bevel gears of the wrist portion and the hollow passage is curved. And there was the problem that at the time of performing the work for attachment/detachment of the cable or hose, the tool is detached from the tool fixing portion and connector is then detached, so it would take much time.

SUMMARY OF THE INVENTION

An object of this invention is to provide a wrist mechanism for an industrial robot in which there is no possibility that rotational operation of the wrist portion is limited, and the performance of the work for attaching/detaching of the cable or hose for the tool is facilitated.

This invention is directed to a wrist mechanism for an industrial robot having a second axis perpendicular to a first axis extending in a length direction of an arm and a third axis perpendicular to the second axis, and including a wrist portion capable of rotating about the second and third axes. The wrist mechanism comprises: first and second reduction mechanisms supported at both side surface portions of the front end portion of the arm having a cut portion so that they can be rotated about the second axis; a wrist frame including a hollow portion and a cut portion fixed at the output shaft of the first reduction mechanism; a first bevel gear including a hollow portion provided at the wrist frame and supported so that it can be rotated about the third axis perpendicular to the second axis; a second bevel gear provided on the wrist frame, rotating about an axis parallel to the second axis and meshing with the first bevel gear; a toothed wheel integral with the second bevel gear; a toothed wheel fixed at the output shaft of the second reduction mechanism and meshing with the toothed wheel integral with the second bevel gear; and a tool fixing portion including a hollow portion fixed to the first bevel gear.

Particularly, cable and hose connected to the tool are provided in the state where they are passed through the hollow portion and the cut portion of the arm, the hollow portion and the cut portion of the wrist frame, and the hollow portion of the first bevel gear.

For this reason, cable and hose are permitted to be passed through the space substantially linearly formed from the hollow portion of the arm up to the tool fixing portion via the cut portion, and a hand can be inserted from the side surface into the cut portion of a relatively broad space of the wrist frame, thus making it possible to carry out connecting work.

Accordingly, in accordance with this invention, it is possible to process cable or hose for a tool within the wrist portion and multi-rotation of the wrist can be made. In addition, performance of the work for connecting cable and hose are facilitated, thus making it possible to reduce connecting work hours.

BEST MODE FOR CARRYING OUT THE INVENTION

Figure 1:
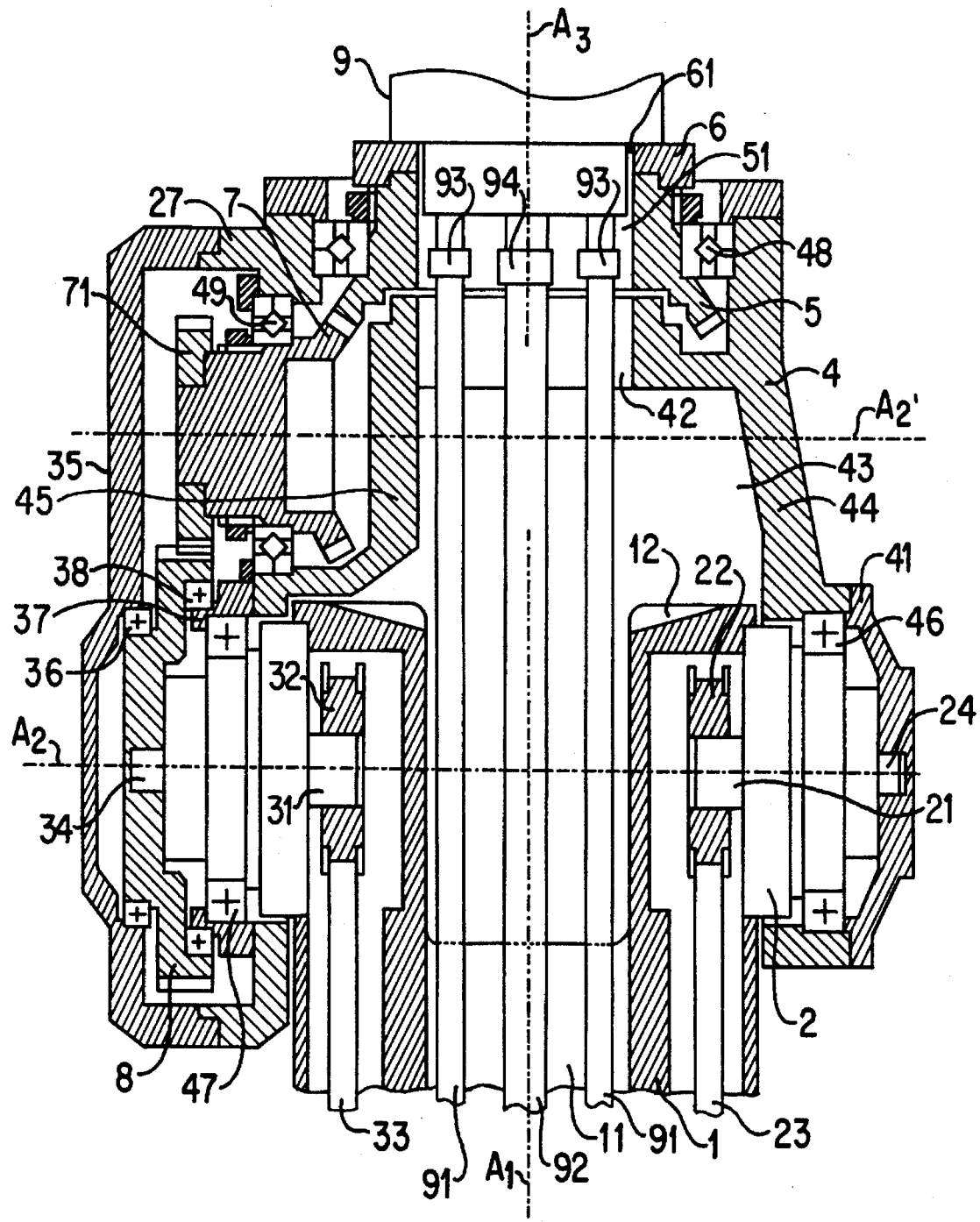
FIG. 1 is a side cross sectional view showing an embodiment of this invention.

This invention will now be described in accordance with the embodiment shown.

FIG. 1 is a side cross sectional view showing the embodiment of this invention. In the figure, reference numeral 1 denotes an arm including hollow portion 11 and a cut portion 12 at one end thereof, and a first reduction mechanism (gears) 2 and a second reduction mechanism (gears) 3 rotating about second axis $A_2$ perpendicular to first axis $A_1$ extending in a length direction of arm 1 are provided at both side surfaces with cut portion 12 at one end being disposed therebetween. Pulleys 22 and 32 are respectively fixed at input shafts 21, 31 of the first and second reduction mechanisms 2 and 3, and these reduction mechanisms are respectively driven by two drive motors provided at the other end (not shown) of arm 1 through timing belts 28 and 33 passing over on pulleys 22 and 32.

At output shaft 24 of first reduction mechanism 2, side surface portions 44, 45 of both sides of wrist frame 4 provided with hollow portion 42 and cut portion 43 through bearing cover 41 are fixed. Moreover, at fixed portions of the first and second reduction mechanism 2 and 3, wrist frame 4 is supported through bearings 46 and 47 so that it can be rotated about second axis $A_2$. By rotating output shaft 24 of the first reduction mechanism 2, wrist frame 4 is rotated about the second axis $A_2$ through bearing cover 41.

At the end portion of wrist frame 4, a first bevel gear 5 in a hollow form is supported so that it can be rotated about the third axis $A_3$ perpendicular to the second axis $A_2$ is provided.

At the first bevel gear 5, tool fixing portion 6 in a hollow form rotating concentrically with the first bevel gear 5 is fixed. Moreover, at the wrist frame 4, there is provided a second bevel gear 7 rotating about axis $A_2'$ in parallel to the second axis $A_2$ through bearing 49 and supported so as to mesh with the first bevel gear 5 and spur gear 71 concentric with the second bevel gear 7 and rotating in one body therewith.

At output shaft 34 of second reduction mechanism 3, spur gear 8 meshing with the spur gear 71 Is fixed. By rotating the output shaft 34, tool fixing portion 6 can be rotated about the third axis $A_3$ through spur gears 8, 71, and first and second bevel gears 5 and 7. The spur gear 8 is rotated relative to housing 35 in view of a bearing 36 therebetween, and the spur gear 8 is rotated relative to a ring element 37 in view of a bearing 38 therebetween. The bearing 49 is rotatable between the second bevel gear 7 and a bearing support part 27 joined to the housing 35.

Tool 9 is fixed at tool fixing portion 6. Connectors 93, 94 of power supply cables 91 and fluid supply hose 92 connected to the tool 9 are projected from hollow portion 61 of tool fixing portion 6 to hollow portion 51 of first bevel gear 5. Cables 91 and hose 92 are passed through hollow portion 42 of wrist frame 4 from hollow portion 11 of arm 1 and are connected to connectors 93, 94.

As stated above, since cables 91 and hose 92 can be passed through space substantially linearly formed from hollow portion 11 and cut portion 12 of arm 1 up to tool fixing portion 6, hand can be inserted from the side surface of wrist frame 4 into cut portion 43 to thus permit implementation of connecting work at cut portion 43 of a relatively broad space, there is no necessity of detaching the tool from tool fixing portion 6. Thus, performing work for attaching/detaching cable or hose is facilated.

This invention can be utilized in the field for manufacturing and providing a wrist mechanism provided at the front end portion of an arm of an industrial robot in which, when applied to a wrist mechanism provided at the front end portion of an arm of an industrial robot, cable or hose for the tool can be processed within the wrist portion, multi-rotation of the wrist portion can be carried out, connecting work of the cable and hose is easy, and connecting time can be reduced.

What is claimed is:

1. An industrial robot comprising an elongated arm having a hollow portion, said arm having a first axis, first and second reduction mechanism supported on opposite sides of said arm, said first and second reduction mechanisms each being rotatable about a second axis which is perpendicular to said first axis, said first reduction mechanism having a first output shaft, said second reduction mechanism having a second output shaft, a wrist frame having a hollow portion, said first and second reduction mechanisms including bearings rotatably supporting said wrist frame for rotation about said second axis, said wrist frame being connected to said first output shaft of said first reduction mechanism such that rotation of said first output shaft effects rotation of said wrist frame about said second axis, a first bevel gear rotatably mounted on said wrist frame for rotation about a third axis perpendicular to said second axis, said first bevel gear having a hollow portion, a second bevel gear rotatably mounted on said wrist frame for rotation about a fourth axis parallel to said second axis, said second bevel gear meshing with said first bevel gear, a first gear wheel fixed to said second bevel gear, a second gear wheel connected to said second output shaft of said second reduction mechanism and meshing with said first gear wheel such that rotation of said second gear wheel effects rotation of said first bevel gear, tool fixing means mounted on said first bevel gear, said tool fixing means having a hollow portion opening up to said hollow portion of said first bevel gear, said hollow portion of said first bevel gear opening up to said hollow portion of said wrist frame, said hollow portion of said wrist frame opening up to said hollow portion of said arm so as to thereby provide a passage through said tool fixing means, said first bevel gear, said wrist frame and said arm, a tool device mounted on said tool fixing means, and utility lines connected to said tool device, said utility lines passing through said passage through said hollow portion of said tool fixing means, said hollow portion of said first bevel gear, said hollow portion of said wrist frame and said hollow portion of said arm.

2. An industrial robot according to claim 1 wherein said passage has a central section which extends linearly through said hollow portion of said tool fixing means, said hollow portion of said first bevel gear, said hollow portion of said wrist frame and said hollow portion of said arm.

3. An industrial robot according to claim 2 wherein said utility lines extend generally linearly through said central section of said passage.

4. An industrial robot according to claim 1 wherein said utility lines comprise electric cables.

5. An industrial robot according to claim 1 wherein said utility lines comprise hoses carrying a fluid.

6. An industrial robot comprising an elongated arm having a hollow end portion, said arm having a first axis, first and second reduction mechanisms supported on opposite sides of said arm, said first and second reduction mechanisms each being rotatable about a second axis which is perpendicular to said first axis, said first reduction mechanism having a first output means, said second reduction mechanism having a second output means, a wrist frame having a hollow portion, said first and second reduction mechanisms including bearings rotatably supporting said wrist frame for rotation about said second axis, said wrist frame being connected to said first output means of said first reduction mechanism such that rotation of said first output means effects rotation of said wrist frame about said second axis, a first bevel gear rotatably mounted on said wrist frame for rotation about a third axis perpendicular to said second axis, said first bevel gear having a central hollow portion, a second bevel gear rotatably mounted on said wrist frame for rotation about a fourth axis parallel to said second axis, said second bevel gear meshing with said first bevel gear, gear means between said second bevel gear and said second output means of said second reduction mechanism such that rotation of said second output means effects rotation of said first bevel gear, and a tool fixing means fixed to said first bevel gear, said tool fixing means having a central hollow portion opening up to said central hollow portion of said first bevel gear, said central hollow portion of said first bevel gear opening up to said hollow portion of said wrist frame, said hollow portion of said wrist frame opening up to said hollow end portion of said arm so as to thereby provide a passage through said tool fixing means, said first bevel gear, said wrist frame and said arm.

7. An industrial robot comprising an elongated arm having a hollow portion, said arm having a first axis, first and second reduction mechanisms supported on opposite sides of said arm, said first and second reduction mechanisms each being rotatable about a second axis which is perpendicular to said first axis, said first reduction mechanism having a first output shaft, said second reduction mechanism having a second output shaft, a wrist frame having a hollow portion, said first and second reduction mechanisms including bearings rotatably supporting said wrist frame for rotation about said second axis, said wrist frame being connected to said first output shaft of said first reduction mechanism such that rotation of said first output shaft effects rotation of said wrist frame about said second axis, a first bevel gear rotatably mounted on said wrist frame for rotation about a third axis perpendicular to said second axis, said first bevel gear having a hollow portion, a second bevel gear rotatably mounted on said wrist frame for rotation about a fourth axis parallel to said second axis, said second bevel gear meshing with said first bevel gear, a first gear wheel fixed to said second bevel gear, a second gear wheel connected to said second output shaft of said second reduction mechanism and meshing with said first gear wheel such that rotation of said second gear wheel effects rotation of said first bevel gear, and tool fixing means mounted on said first bevel gear, said tool fixing means having a hollow portion opening up to said hollow portion of said first bevel gear, said hollow portion of said first bevel gear opening up to said hollow portion of said wrist frame, said hollow portion of said wrist frame opening up to said hollow portion of said arm so as to thereby provide a passage through said tool fixing means, said first bevel gear, said wrist frame and said arm, said hollow portion of said tool fixing portion, said hollow portion of said first bevel gear, said hollow portion of said wrist frame, and said hollow portion of said arm being all generally axially aligned.

8. An industrial robot comprising an elongated arm having a hollow portion, said arm having a first axis, first and second reduction mechanisms supported on opposite sides of said arm, said first and second reduction mechanisms each being rotatable about a second axis which is perpendicular to said first axis, said first reduction mechanism having a first output shaft, said second reduction mechanism having a second output shaft, a wrist frame having a hollow portion, said first and second reduction mechanisms including bearings rotatably supporting said wrist frame for rotation about said second axis, said wrist frame being connected to said first output shaft of said first reduction mechanism such that rotation of said first output shaft effects rotation of said wrist frame about said second axis, a first bevel gear rotatably mounted on said wrist frame for rotation about a third axis perpendicular to said second axis, said first bevel gear having a hollow portion, a second bevel gear rotatably mounted on said wrist frame for rotation about a fourth axis parallel to said second axis, said second bevel gear meshing with said first bevel gear, a first gear wheel fixed to said second bevel gear, a second gear wheel connected to said second output shaft of said second reduction mechanism and meshing with said first gear wheel such that rotation of said second gear wheel effects rotation of said first bevel gear, and tool fixing means mounted on said first bevel gear, said tool fixing means having a hollow portion opening up to said hollow portion of said first bevel gear, said hollow portion of said first bevel gear opening up to said hollow portion of said wrist frame, said hollow portion of said wrist frame opening up to said hollow portion of said arm so as to thereby provide a passage through said tool fixing means, said first bevel gear, said wrist frame and said arm, said hollow portion of said tool fixing portion, said hollow portion of said first bevel gear, said hollow portion of said wrist frame, and said hollow portion of said arm being all disposed along a passage axis which is coincident with said first axis.

9. An industrial robot comprising an elongated arm having a hollow portion, said arm having a first axis, first and second reduction mechanisms supported on opposite sides of said arm, said first and second reduction mechanisms each being rotatable about a second axis which is perpendicular to said first axis, said first reduction mechanism having a first output shaft, said second reduction mechanism having a second output shaft, a wrist frame having a hollow portion, said first and second reduction mechanisms including bearings rotatably supporting said wrist frame for rotation about said second axis, said wrist frame being connected to said first output shaft of said first reduction mechanism such that rotation of said first output shaft effects rotation of said wrist frame about said second axis, a first bevel gear rotatably mounted on said wrist frame for rotation about a third axis perpendicular to said second axis, said first bevel gear having a hollow portion, a second bevel gear rotatably mounted on said wrist frame for rotation about a fourth axis parallel to said second axis, said second bevel gear meshing with said first bevel gear, a first gear wheel fixed to said second bevel gear, a second gear wheel connected to said second output shaft of said second reduction mechanism and meshing with said first gear wheel such that rotation of said second gear wheel effects rotation of said first bevel gear, and tool fixing means mounted on said first bevel gear, said tool fixing means having a hollow portion opening up to said hollow portion of said first bevel gear, said hollow portion of said first bevel gear opening up to said hollow portion of said wrist frame, said hollow portion of said wrist frame opening up to said hollow portion of said arm so as to thereby provide a passage through said tool fixing means, said first bevel gear, said wrist frame and said arm, said arm having a terminating end, said terminating end being open such that the hollow portion of said arm is in open communication with said hollow portion of said wrist frame through said open terminating end of said arm.

10. An industrial robot comprising an elongated arm having a hollow portion, said arm having a first axis, first and second reduction mechanisms supported on opposite sides of said arm, said first and second reduction mechanisms each being rotatable about a second axis which is perpendicular to said first axis, said first reduction mechanism having a first output shaft, said second reduction mechanism having a second output shaft, a wrist frame having a hollow portion, said first and second reduction mechanisms including bearings rotatably supporting said wrist frame for rotation about said second axis, said wrist frame being connected to said first output shaft of said first reduction mechanism such that rotation of said first output shaft effects rotation of said wrist frame about said second axis, a first bevel gear rotatably mounted on said wrist frame for rotation about a third axis perpendicular to said second axis, said first bevel gear having a hollow portion, a second bevel gear rotatably mounted on said wrist frame for rotation about a fourth axis parallel to said second axis, said second bevel gear meshing with said first bevel gear, a first gear wheel fixed to said second bevel gear, a second gear wheel connected to said second output shaft of said second reduction mechanism and meshing with said first gear wheel such that rotation of said second gear wheel effects rotation of said first bevel gear, and tool fixing means mounted on said first bevel gear, said tool fixing means having a hollow portion opening up to said hollow portion of said first bevel gear, said hollow portion of said first bevel gear opening up to said hollow portion of said wrist frame, said hollow portion of said wrist frame opening up to said hollow portion of said arm so as to thereby provide a passage through said tool fixing means, said first bevel gear, said wrist frame and said arm, said wrist frame having a terminating end, said terminating end being open such that said hollow portion of said wrist frame is in open communication with said hollow portion of said first bevel gear through said open terminating end of said wrist frame.

* * * * *